United States Patent
Ma (10) Patent No.: US 9,448,921 B2
(45) Date of Patent: Sep. 20, 2016

(54) PAGE ALLOCATION FOR FLASH MEMORIES

(71) Applicant: Empire Technology Development LLC, Wilmington (DE)

(72) Inventor: Xudong Ma, Monterey Park, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 248 days.

(21) Appl. No.: 13/879,708

(22) PCT Filed: Jan. 11, 2013

(86) PCT No.: PCT/US2013/021168
§ 371 (c)(1),
(2) Date: Apr. 16, 2013

(87) PCT Pub. No.: WO2014/109756
PCT Pub. Date: Jul. 17, 2014

(65) Prior Publication Data
US 2014/0201426 A1    Jul. 17, 2014

(51) Int. Cl.
*G06F 12/02* (2006.01)

(52) U.S. Cl.
CPC ... *G06F 12/0246* (2013.01); *G06F 2212/7202* (2013.01)

(58) Field of Classification Search
CPC ........... G06F 17/30867; G06F 17/211; G06F 17/2247; G06F 17/24; G06F 17/30905; G06F 11/008; G06F 9/4443; G06F 12/0246; G06F 17/2229; G06F 2212/7202; G06F 3/0237; H04L 67/02
USPC ........... 711/103; 1/1; 707/E17.121, E17.009, 707/748
See application file for complete search history.

(56) References Cited

U.S. PATENT DOCUMENTS

| | | | |
|---|---|---|---|
| 5,469,448 A | 11/1995 | Denissen et al. |
| 5,742,934 A | 4/1998 | Shinohara |
| 5,873,112 A | 2/1999 | Norman |
| 6,069,827 A | 5/2000 | Sinclair |

(Continued)

FOREIGN PATENT DOCUMENTS

| | | |
|---|---|---|
| CN | 101676882 A | 3/2010 |
| EP | 1424631 | 3/2008 |
| EP | 2329380 B1 | 3/2013 |
| EP | 2633414 A4 | 3/2014 |
| JP | 2002351738 A | 12/2002 |
| JP | 2004038971 A | 2/2004 |

(Continued)

OTHER PUBLICATIONS

International Search Report and Written Opinion for PCT Application No. PCT/US13/027851 mailed Apr. 30, 2013.

(Continued)

*Primary Examiner* — Yong Choe
*Assistant Examiner* — Edward Waddy, Jr.
(74) *Attorney, Agent, or Firm* — Turk IP Law, LLC (57) ABSTRACT

Technologies are described herein for allocating pages in a flash memory. Some example technologies may receive multiple data elements and a write request to write the multiple data elements to the flash memory. Example technologies may identify a correlation between a subset of the data elements based on correlation criteria. Example technologies may allocate neighboring pages of the flash memory for storing the subset of the data elements. Example technologies may write the subset of the data elements into the allocated pages.

17 Claims, 5 Drawing Sheets

(56) References Cited

U.S. PATENT DOCUMENTS

| | | | |
|---|---|---|---|
| 6,492,918 | B1 | 12/2002 | Rezzi et al. |
| 6,933,864 | B1 | 8/2005 | Buch et al. |
| 6,973,613 | B2 | 12/2005 | Cypher |
| 7,065,607 | B2 | 6/2006 | England et al. |
| 7,907,070 | B2 | 3/2011 | Wu et al. |
| 8,031,526 | B1 | 10/2011 | Wu et al. |
| 8,085,605 | B2 | 12/2011 | Yang et al. |
| 8,423,867 | B2 | 4/2013 | Ma |
| 8,595,591 | B1 | 11/2013 | Shalvi et al. |
| 8,924,832 | B1* | 12/2014 | Lam .................... 714/799 |
| 2003/0086302 | A1 | 5/2003 | Kurakata et al. |
| 2008/0082744 | A1 | 4/2008 | Nakagawa |
| 2008/0158950 | A1* | 7/2008 | Aritome ................ 365/185.03 |
| 2008/0183964 | A1* | 7/2008 | Inoue .............. G06F 11/1076 711/114 |
| 2008/0189073 | A1 | 8/2008 | Jagmohan et al. |
| 2008/0244164 | A1 | 10/2008 | Chang et al. |
| 2008/0294965 | A1 | 11/2008 | Ni et al. |
| 2008/0307158 | A1* | 12/2008 | Sinclair ............ G06F 12/0246 711/103 |
| 2009/0132756 | A1 | 5/2009 | Hsieh |
| 2009/0144512 | A1 | 6/2009 | Yoshida |
| 2009/0164701 | A1* | 6/2009 | Murray ............... G11B 27/105 711/103 |
| 2009/0217123 | A1 | 8/2009 | Dore et al. |
| 2009/0237999 | A1* | 9/2009 | Li ............................ 365/185.12 |
| 2010/0070735 | A1 | 3/2010 | Chen et al. |
| 2010/0194607 | A1 | 8/2010 | Smith |
| 2010/0205504 | A1 | 8/2010 | Fung |
| 2011/0022938 | A1* | 1/2011 | Wilkinson ........ G06F 17/3089 715/205 |
| 2011/0107056 | A1 | 5/2011 | Kuo |
| 2011/0141815 | A1 | 6/2011 | Haratsch et al. |
| 2011/0145487 | A1 | 6/2011 | Haratsch et al. |
| 2011/0167239 | A1* | 7/2011 | Horn ................ G06F 17/30129 711/171 |
| 2011/0216586 | A1 | 9/2011 | Graef et al. |
| 2011/0246710 | A1 | 10/2011 | Strope |
| 2011/0246739 | A1* | 10/2011 | Matsuda ............. G06F 3/0605 711/165 |
| 2011/0305082 | A1 | 12/2011 | Haratsch et al. |
| 2012/0096289 | A1* | 4/2012 | Kawakami ........... G06F 1/3221 713/320 |
| 2012/0110418 | A1 | 5/2012 | Ma |
| 2012/0155535 | A1 | 6/2012 | Hong et al. |
| 2012/0256949 | A1* | 10/2012 | Treat et al. ..................... 345/629 |
| 2013/0031440 | A1 | 1/2013 | Sharon et al. |
| 2013/0124891 | A1* | 5/2013 | Donaldson ............ G06F 1/163 713/322 |
| 2013/0166994 | A1 | 6/2013 | Mittelholzer et al. |
| 2013/0185598 | A1* | 7/2013 | Haratsch ............ G06F 11/1048 714/42 |
| 2013/0212319 | A1* | 8/2013 | Hida .................. G06F 12/0246 711/103 |
| 2013/0268723 | A1 | 10/2013 | Jiang et al. |
| 2014/0053043 | A1 | 2/2014 | Shalvi et al. |

FOREIGN PATENT DOCUMENTS

| | | |
|---|---|---|
| JP | 2008084270 A | 4/2008 |
| JP | 2009116661 A | 5/2009 |
| JP | 2009135854 A | 6/2009 |
| JP | 2009272016 | 11/2009 |
| WO | 0180249 A1 | 10/2001 |
| WO | 2010002941 | 1/2010 |
| WO | 2010033455 A2 | 3/2010 |
| WO | 2012023102 | 5/2012 |
| WO | 2012057777 | 5/2012 |

OTHER PUBLICATIONS

U.S. Office Action dated Jan. 27, 2012 in U.S. Appl. No. 13/059,808.

Kuznetsov et al., "Coding in a memory with Defective Cells," Probl. Peredachi Inf., 1974, 10:2, 52-60.

Dong, G., et al., "Using Data Postcompensation and Predistortion to Tolerate Cell-to-Cell Interference in MLC NAND Flash Memory", IEEE Transactions on Circuits and Systems—I: Regular Papers, vol. 57, No. 10, Oct. 2010.

Kudekar, S., et al., "Linear Programming based Detectors for Two-Dimensional Intersymbol Interference Channels", Center for Nonlinear Studies and Theoretical Division T-4, Los Alamos National Laboratory, Los Alamos, NM, USA.

International Search Report and Written Opinion for PCT Application No. PCT/US2013/021168 mailed Mar. 4, 2013.

International Search Report and Written Opinion for PCT Application No. PCT/US2010/054634 mailed Dec. 14, 2010.

U.S. Office Action dated Dec. 27, 2012 in U.S. Appl. No. 13/059,808.

U.S. Notice of Allowance dated May 21, 2012 in U.S. Appl. No. 13/059,808.

U.S. Notice of Allowance dated Dec. 28, 2012 in U.S. Appl. No. 13/059,808.

Aritome, et al. "Reliability Issues of Flash Memory Cells," May 1993, Proceedings of the IEEE, 81(5):776-788.

Olson and Langlois, "Solid State Drives Data Reliability and Lifetime," [http://www.csee.umbc.edu/~squire/images/ssd1.pdf] Apr. 7, 2008, pp. 1-27.

Heegard, C., "Partitioned Linear Block Codes for Computer Memory with 'stuck-at' Defects," IEEE Transactions on Information Theory, vol. 29, No. 6, Nov. 1983, pp. 831-842.

Heegard, C. and El-Gamal, A., "On the Capacity of Computer Memory with Defects," IEEE Transactions on Information Theory, vol. 29, No. 5, Sep. 1983, pp. 731-739.

Yaakobi et al., "Error Characterization and Coding Schemes for Flash Memories," pp. 1-5, Proc. Workshop on the Application of Communication Theory to Emerging Memory Technologies, Miami, Florida, Dec. 2010.

Wei, M. et al., "Reliably Erasing Data From Flash-Based Solid State Drives," [http://cseweb.ucsd.edu/users/swanson/papers/Fast2011SecErase.pdf] pp. 1-13, FAST 11 (2011).

Kuznetsov, A.V. et al., "Coding in a memory with Defective Cells," Probl. Peredachi Inf., 1974, 10:2, 52-60.

Jiang, A. and Bruck, J. et al, "Joint Coding for Flash Memory Storage," IEEE International Symposium on Information Theory, pp. 1741-1745 (2008).

Jiang, A., et al., "Rewriting Codes for Joint Information Storage in Flash Memories," IEEE Transactions on Information Theory, vol. 56, No. 10, pp. 5300-5313 (2010).

Zhang, F., et al., "LDPC Codes for Rank Modulation in Flash Memories," IEEE International Symposium on Information Theory, ISIT 2010, pp. 859-863(2010).

Supplementary European Search Report for European Application No. 10 85 9090, mailed on Feb. 24, 2014.

International Search Report and Written Opinion for International Application No. PCT/US2013/74948 mailed May 27, 2014.

Mézard, M., and Zecchina, R., "Random K-satisfiability problem: From an analytic solution to an effcient algorithm," Physical Review E, vol. 66, No. 5. pp. 056126-1-056126-27 (2002).

Murayama, T., "Thouless-Anderson-Palmer Approach for Lossy Compression," Phys. Rev. E , vol. 69, pp. 1-10 (Mar. 31, 2004).

Murayama, T., and Okada, M., "One step RSB scheme for the rate distortion function," Journal of Physics A: Mathematical and General, vol. 36, No. 43, pp. 1123-1130 (2003).

Regalia, P.A., "A Modified Belief Propagation Algorithm for Code Word Quantization," IEEE Transactions on Communications, vol. 57, No. 12, pp. 3513-3517 (Dec. 2009).

Teshome, S., and Chung, T-S., "A Tri-Pool Dynamic Wear-Leveling Algorithm for Large Scale Flash Memory Storage Systems," Proceedings of the 2011 International Conference on Information Science and Applicatons, pp. 1-6 (Apr. 26-29, 2011).

Wainwright, M.J., et al., "Lossy Source Compression Using Low-Density Generator Matrix Codes: Analysis and Algorithms," IEEE Transactions on Information Theory, vol. 56, No. 3, pp. 1351-1368 (Mar. 2010).

Wang, J., "Absorbing Set Analysis of LDPC Codes and Read-Channel Quantization in Flash Memory," Doctor of Philosophy in Electrical Engineering, pp. 1-125 (2012).

(56) References Cited

OTHER PUBLICATIONS

Wang, J., et al., "LDPC Decoding with Limited-Precision Soft Information in Flash Memories," Computer Science > Information Theory, pp. 1-27 (2012).

You-SungChang., "Conforming Inverted Data Store for Low Power Memory," IEEE Low Power Electronics and Design., pp. 91-93 (Aug. 17, 1999).

Anxiao Jiang., "On the Generalization of Error-Correcting WOM Codes," IEEE International Symposium on., pp. 1391-1395 (Jun. 24-29, 2007).

Hilary Finucane., "Worst-Case and Average-Case Floating Codes for Flash Memory" Harvard University Cambridge Massachusetts,. pp. 1-51 (Mar. 20, 2009).

* cited by examiner

500 A COMPUTER PROGRAM PRODUCT

502 A SIGNAL BEARING MEDIUM

504 AT LEAST ONE OF
  ONE OR MORE INSTRUCTIONS FOR RECEIVING A PLURALITY OF DATA ELEMENTS AND A WRITE REQUEST TO WRITE THE PLURALITY OF DATA ELEMENTS TO A FLASH MEMORY;
  ONE OR MORE INSTRUCTIONS FOR IDENTIFYING A CORRELATION BETWEEN A SUBSET OF THE DATA ELEMENTS BASED ON CORRELATION CRITERIA;
  ONE OR MORE INSTRUCTIONS FOR ALLOCATING NEIGHBORING PAGES OF THE FLASH MEMORY FOR STORING THE SUBSET OF THE DATA ELEMENTS; OR
  ONE OR MORE INSTRUCTIONS FOR WRITING THE SUBSET OF THE DATA ELEMENTS INTO THE ALLOCATED PAGES.

506 A COMPUTER-READABLE MEDIUM

508 A RECORDABLE MEDIUM

510 A COMMUNICATIONS MEDIUM

*Fig. 5*

PAGE ALLOCATION FOR FLASH MEMORIES

CROSS-REFERENCE TO RELATED APPLICATION

This Application is the U.S. National Stage filing under 35 U.S.C §371 of International Application No. PCT/US13/21168 filed on Jan. 11, 2013. The International Application is herein incorporated by reference in its entirety.

BACKGROUND

Unless otherwise indicated herein, the materials described in this section are not prior art to the claims in this application and are not admitted to be prior art by inclusion in this section.

In a flash memory, information can be recorded by altering the threshold voltage level of one or more memory cells within the flash memory. During a write operation, modification of the threshold voltage level of a first memory cell may cause disturbances to the threshold voltage level of a nearby second memory cell. That is, the threshold voltage level of the second memory cell may unintentionally change, which can result in an error when decoding the second memory cell. Such disturbances may be referred to as inter-cell interference.

Some approaches to addressing decoding errors caused by inter-cell interference involve utilization of joint decoding decisions. In a joint decoding decision, the threshold voltage levels of a requested memory cell as well as non-requested, neighboring memory cells may be read. The joint decoding decision may utilize the threshold voltage levels of the neighboring memory cells in order to accurately decode the requested memory cell. In particular, the threshold voltage levels of the neighboring memory cells may be utilized to compensate for potential interference to the requested memory cell. However, the implementation of a joint decoding decision may result in inefficiencies in systems that utilize conventional page allocation schemes for flash memories.

SUMMARY

The present disclosure generally describes techniques for allocating pages in a flash memory. Some example methods may receive multiple data elements and a write request to write the multiple data elements to the flash memory. Example methods may identify a correlation between a subset of the data elements based on correlation criteria. Example methods may allocate neighboring pages of the flash memory for storing the subset of the data elements. Example methods may write the subset of the data elements into the allocated pages.

The present disclosure generally further describes some computer-readable medium having computer-executable instructions stored thereon which, when executed by a computer, cause the computer to perform one or more operations for allocating pages in a flash memory. Some example operations may include receiving multiple data elements and a write request to write the multiple data elements to the flash memory. Example operations may include identifying a correlation between a subset of the data elements based on correlation criteria. Example operations may include allocating neighboring pages of the flash memory for storing the subset of the data elements. Example operations may include writing the subset of the data elements into the allocated pages.

The present disclosure generally also describes some computing devices adapted to allocate pages in a flash memory. The computing devices may include a flash memory and an operating system. The flash memory may include a multiple memory cells arranged to form multiple memory pages. The operating system may be coupled to the flash memory and may be configured to perform one or more operations. Some example operations may include receiving multiple data elements and a write request to write the multiple data elements to the flash memory. Example operations may include identifying a correlation between a subset of the data elements based on correlation criteria. Example operations may include allocating neighboring pages of the flash memory for storing the subset of the data elements. Example operations may include writing the subset of the data elements into the allocated pages.

The foregoing Summary is illustrative only and is not intended to be in any way limiting. In addition to the illustrative aspects, embodiments, and features described above, further aspects, embodiments, and features will become apparent by reference to the Figures and the following Detailed Description.

BRIEF DESCRIPTION OF THE FIGURES

The foregoing and other features of this disclosure will become more fully apparent from the following Detailed Description, accompanying Figures, and appended claims. Understanding that these Figures depict only several embodiments in accordance with the disclosure and are, therefore, not to be considered limiting of its scope, the disclosure will be described with additional specificity and detail with reference to the accompanying Figures, in which:

DETAILED DESCRIPTION

In the present Detailed Description, reference is made to the accompanying Figures, which form a part hereof. In the Figures, similar symbols typically identify similar components, unless context dictates otherwise. The illustrative embodiments described in the Detailed Description and Figures are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to technologies adapted to implement page allocation schemes for flash memories. The technologies may be adapted to identify highly correlated files, file segments, or other data elements. As used herein, highly correlated data elements may refer to data elements that are accessed concurrently, sequentially, and/or within a threshold amount of time. The technologies may be adapted to allocate neighboring memory pages in a flash memory for storing the highly correlated data elements. The highly correlated data elements may be written into the allocated neighboring memory pages.

A common drawback experienced in flash memories is inter-cell interference. Inter-cell interference may refer to disturbances to nearby memory cells that result when writing to an intended memory cell. As flash memory technology continues to evolve, the geometrical sizes of each memory cell in a flash memory may continue to scale down, and the memory cells may be arranged closer together. These advancements may allow for the placement of more memory cells within the same area on the flash memory. As a result, inter-cell interference may become worse in future flash memories.

Some approaches to addressing inter-cell interference may involve the utilization of a joint decoding decision. In conventional bit-wise decoding processes, each requested memory cell may be decoded independently. However, the decoded result obtained from the requested memory cell may be incorrect due to inter-cell interference. In a joint decoding decision, neighboring memory cells may be utilized in order to more accurately decode the requested memory cell. Neighboring memory cells are memory cells that are geometrically close to one another. Two memory pages are called neighbors, or neighboring memory pages, if at least one memory cell in one memory page is a neighbor to at least one memory cell in the other memory page. Neighboring memory cells may include memory cells located on the same page as the requested memory cell as well as memory cells located on neighboring pages.

Conventional flash memories may allocate pages as they become available. That is, a conventional flash memory may simply allocate the next clean page when a page is requested, without regard to characteristics of the data elements to be stored on the flash memory. The next clean page may not be neighboring or even close to the previous page. As a result, highly correlated data that spans multiple pages may be stored on non-neighboring or distant pages.

When implementing a joint decoding decision, the reading of each requested memory cell corresponding to the highly correlated data elements may include the reading of non-requested neighboring memory cells. The neighboring memory cells may be located in pages separate from the pages that contain the requested memory cells. The reading of multiple pages that do not contain requested memory cells may result in various performance inefficiencies, in terms of overall reading speeds, error rates, implementation complexities, or combinations thereof.

Various embodiments described herein provide for the allocation of neighboring pages for storing highly correlated data elements. By storing the highly correlated data elements on neighboring pages, the quantity of pages that do not contain requested memory cells may be substantially decreased when implementing a joint decoding decision. For example, a first read request and a second read request may request highly correlated data. A given page that is read may include a memory cell that is not part of the first read request but is part of a joint decoding decision for a memory cell on another page. However, the given page may also include a memory cell (which may or may not be the same) that is part of the second read request. As a result, the allocation of neighboring pages for storing highly correlated data elements may result in improved performance efficiencies over conventional page allocation approaches when implementing a joint decoding decision.

Figure 1:
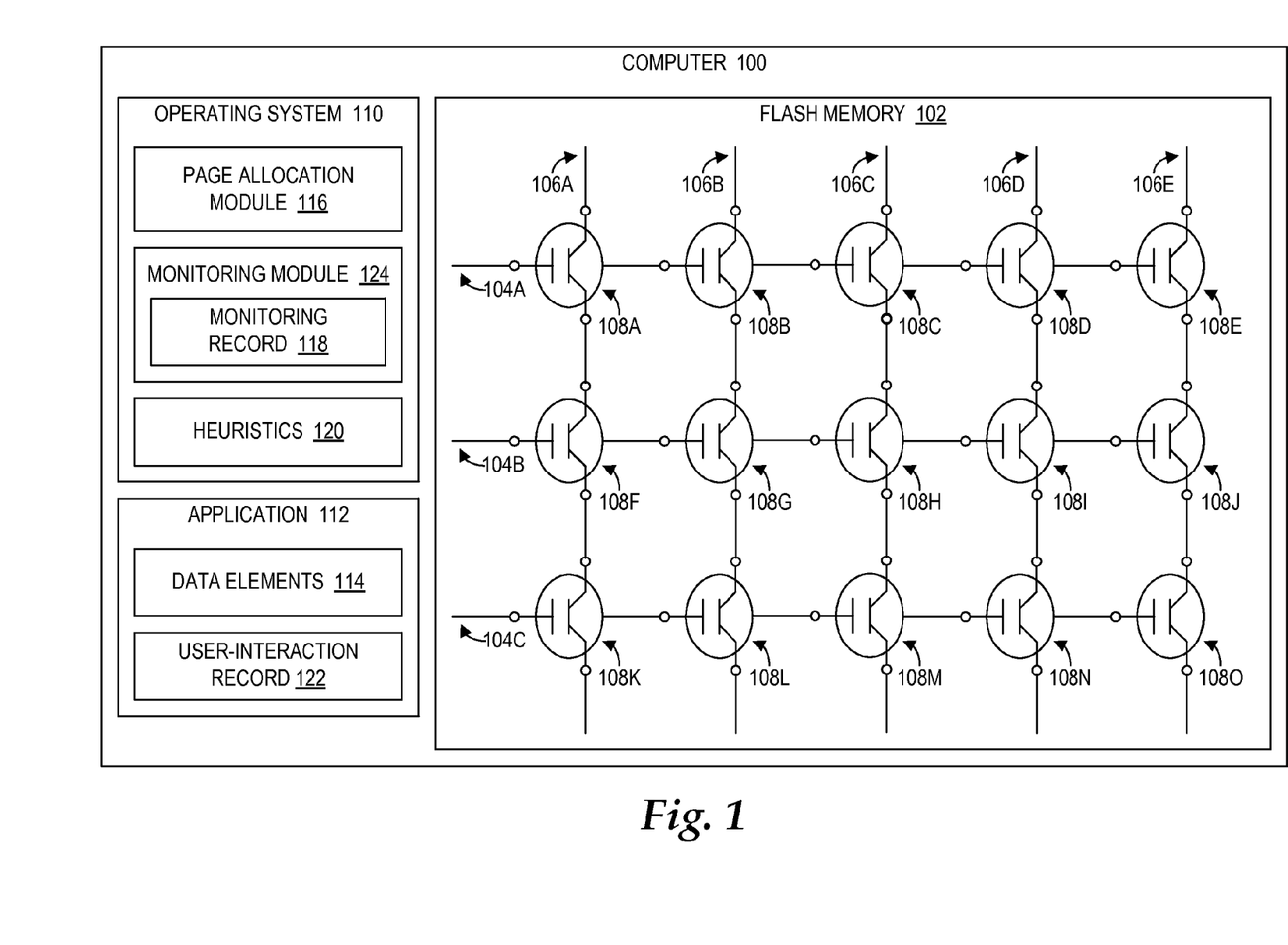
FIG. 1 is a diagram illustrating an example architecture of a computer adapted to allocate pages in a flash memory.

FIG. 1 is a diagram illustrating an example architecture of a computer 100 adapted to allocate pages in a flash memory, arranged in accordance with at least some embodiments presented herein. The computer 100 may include a flash memory 102. The flash memory 102 may be an internal memory device or an external memory device with respect to the computer 100. The flash memory 102 might be a NOT AND ("NAND") type flash memory or a NOT OR ("NOR") type flash memory. The flash memory 102 might also be a single-level-cell type flash memory or a multi-level-cell type flash memory. Other types of flash memory devices might also be utilized.

A portion of an example internal configuration of the flash memory 102 is illustrated in FIG. 1. The flash memory 102 may include multiple word lines, including a first wordline 104A, a second wordline 104B, and a third wordline 104C (collective referred to as wordlines 104). The wordlines 104 are sometimes colloquially referred to as "rows" in the flash memory 102. The flash memory 102 may further include multiple bitlines, including a first bitline 106A, a second bitline 106B, a third bitline 106C, a fourth bitline 106D, and a fifth bitline 106E (collectively referred to as bitlines 106). The bitlines 106 are sometimes colloquially referred to as "columns" in the flash memory 102.

The flash memory 102 may also include multiple memory cells 108A-108O (collectively referred to as memory cells 108). Each of the memory cells 108 may be arranged at the intersection of one of the wordlines 104 and one of the bitlines 106. Each of the memory cells 108 may include a channel that is arranged between a source and a drain. A floating gate may be arranged over the channel and may be electrically separated from the channel. A control gate may be arranged over the floating gate, and may be electrically separated from the floating gate. The control gate may be coupled to one of the wordlines 104, and the source and drain may be coupled to one of the bitlines 106. Control gates from multiple memory cells may share a given wordline, and sources and drains from multiple memory cells may share a given bitline. For example, the control gates of the memory cells 108A-108E may share the first wordline 104A, and the sources and drains of the memory cells 108A, 108F, 108K may share the first bitline 106A.

Each memory cell may be programmed by storing a charge on the floating gate. A charged floating gate may represent a first logic state (e.g., a logical "0"), and a non-charged floating gate may represent a second logic state (e.g., a logical "1"). A memory cell may be programmed by applying a first voltage (e.g., a negative voltage) to a corresponding bitline and applying a second voltage (e.g., a positive voltage) that is higher than the first voltage to a corresponding wordline. Through a process known as tunnel injection, the floating gate corresponding to the intersecting bitline and wordline may accumulate and trap a negative charge. The accumulated negative charge in the floating gate may effectively increase the threshold voltage level of the memory cell. Thus, by reading the threshold voltage level of a given memory cell, the logic state programmed into the memory cell can be decoded by determining whether the threshold voltage level has increased.

Due to parasitic capacitance-coupling effects, the application of a voltage to an intended memory cell may unintentionally affect the voltage levels of control gates, sources, and/or drains of neighboring memory cells. The neighboring memory cells may include memory cells that are immediately adjacent to the intended memory cell and/or memory cells that are within some threshold distance to the intended memory cell. The unintentional effect on neighboring memory cells caused by writing to an intended memory cell may be referred to as inter-cell interference. For example, writing to the memory cell 108H may unintentionally affect the voltage levels of one or more of the memory cells 108B-108D, 108G, 108G, 108L-108N. When the threshold voltage level of an unintentionally affected memory cell is read, the decoded logic state of the memory cell may be incorrect due to the inter-cell interference (e.g., a memory cell that should be decode as a logical "1" may be incorrectly decoded as a logical "0").

A page may refer to the smallest area of the flash memory 102 that can support a read operation or a write operation. A block may refer to the smallest area of the flash memory 102 that can support an erase operation. A page may include multiple memory cells. A block may include multiple pages. Each of the wordlines 104 may include one or more pages. In some embodiments, each of the wordlines 104 may correspond to one page. In some other embodiments, each of the wordlines 104 may correspond to two or more pages. In some other embodiments, where each memory cell may store multiple bits, a page may refer to bits stored in a group of memory cells. For example, one memory page may refer to the most significant bits of one group of memory cells. In this case, the memory page may be considered to contain the group of memory cells.

The computer 100 may be configured to execute an operating system 110 and an application 112. The application 112 may be configured to generate a read request for reading data elements from the flash memory 102 or a write request for writing data elements to the flash memory 102. The operating system 110 may be configured to perform read operations on the flash memory 102 to fulfill the read request. The operating system 110 may also be configured to perform write operations on the flash memory 102 to fulfill the write request.

The operating system 110 may be configured to implement a joint decoding decision when reading data elements from the flash memory 102. When implementing a joint decoding decision, the operating system 110 may read the threshold voltage levels of not only a requested memory cell but also memory cells neighboring the requested memory cell. The joint decoding decision may decode the requested memory cell utilizing the threshold voltage levels of the neighboring memory cells in order to compensate for possible interference caused by the neighboring memory cells.

When the operating system 110 receives a write request to write data elements 114 to the flash memory 102, a page allocation module 116 may be configured to determine correlations between two or more of the data elements 114. The correlations may be determined utilizing a monitoring record 118, heuristics 120, and/or a user-interaction record 122, as described in greater detail below with reference to FIG. 3. The correlations may be utilized to form groups of two or more highly correlated data elements. The page allocation module 116 may be configured to allocate neighboring pages of the flash memory 102 for storing each group of highly correlated data elements. The page allocation module 116 may be implemented in the operating system 110, a flash memory controller (not shown), or some other software, hardware, or firmware capable of implementing the page allocation technologies described herein.

In an illustrative example, the operating system 110 may receive a series of read requests that identify multiple memory cells to be read from the flash memory 102. When implementing a joint decoding decision, the operating system 110 may be configured to read not only the requested memory cells, but also non-requested memory cells that are neighboring the requested memory cells. Some of the neighboring memory cells may be contained on the same pages as the requested memory cells. However, some other neighboring memory cells may be contained in neighboring pages that do not contain the requested memory cells identified in the series of read requests. The reading of multiple neighboring pages that do not contain the requested memory cells may result in various performance inefficiencies, in terms of overall reading speeds, error rates, implementation complexities, or combinations thereof.

In order to reduce the quantity of unique pages that are read but do not contain the requested memory cells, the page allocation module 116 may be configured to allocate neighboring pages for highly correlated data elements. Highly correlated data elements may refer to data elements that are accessed concurrently, sequentially, or within a threshold amount of time. For example, highly correlated data elements may refer to data elements that have some relation such that the data elements are likely to be accessed together via the series of read requests. When highly correlated data elements have been identified, the page allocation module 116 may be configured to allocate neighboring pages in the flash memory 102 for storing the highly correlated data elements. When the neighboring pages in the flash memory 102 have been allocated, the operating system 110 may write the highly correlated data elements into the allocated neighboring pages.

When the operating system 110 receives the series of read requests, the operating system 110 may be configured to read, for each requested memory cell, a page containing the requested memory cell as well as neighboring pages containing non-requested memory cells neighboring the requested memory cell. The series of read requests may be directed to reading the highly correlated data elements stored in the flash memory 102. As a result, at least some of the neighboring pages that are read for one read request may contain a requested memory cell for another read request. Thus, by storing highly correlated data on neighboring pages, a greater quantity of pages may contain both requested memory cells and non-requested neighboring memory cells for satisfying the series of read requests. Therefore, the quantity of unique pages that are read but do not contain a requested memory cell identified in the series of read requests can be substantially reduced. In some embodiments, the read operations of the operating system 110 may be optimized such that overlapping pages that are read between different read requests are read only once.

Figure 2:
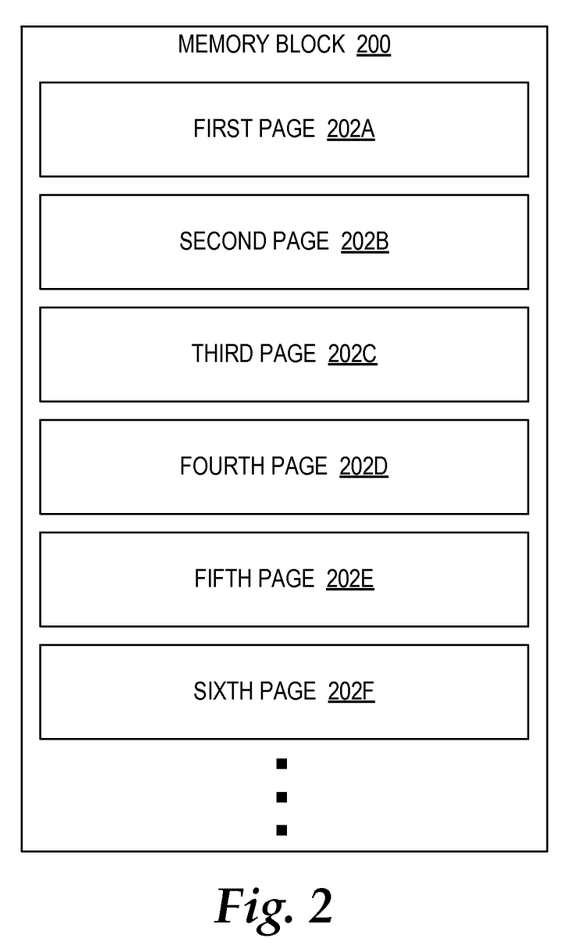
FIG. 2 is a diagram illustrating an example arrangement of pages in a memory block of the flash memory.

FIG. 2 is a diagram illustrating an example arrangement of pages in a memory block 200 of the flash memory 102, arranged in accordance with at least some embodiments presented herein. The memory block 200 may include multiple pages, including a first page 202A, a second page 202B, a third page 202C, a fourth page 202D, a fifth page 202E, and a sixth page 202F (collectively referred to as pages 202). The pages 202 may represent adjacent pages in the flash memory 102. In some embodiments, each of the pages 202 may represent one of the wordlines 104 in the flash memory 102. In some other embodiments, two or more of the pages 202 may be included in one of the wordlines 104 in the flash memory 102.

Conventional page allocation mechanisms may allocate the next clean page available in the flash memory 102 in response to a write request, without regard to characteristics of the data elements to be stored in the flash memory. For example, in conventional page allocation mechanisms, highly correlated data elements may be stored in the first page 202A, the third page 202C, and the fifth page 202E. In this example, the operating system 110 may receive a series of read requests for the highly correlated data elements contained in the first page 202A, the third page 202C, and the fifth page 202E. In response to the series of read requests, the operating system 110 may be configured to read the first page 202A, the third page 202C, and the fifth page 202E, which contain the requested memory cells.

When implementing a joint decoding decision, the operating system 110 may also be configured to read the threshold voltage levels of neighboring memory cells, some which may be contained in neighboring pages. The second page 202B may neighbor the first page 202A. The fourth page 202D may neighbor the third page 202C. The sixth page 202F may neighbor the fifth page 202E. Thus, the operating system 110 may be configured to also read the second page 202B, the fourth page 202D, and the sixth page 202F. However, the reading of the second page 202B, the fourth page 202D, and the sixth page 202F may not be efficient because these pages are not part of the read request.

According to various embodiments, the page allocation module 116 may be configured to allocate the same highly correlated data elements to neighboring pages, such as the first page 202A, the second page 202B, and the third page 202C. In this case, the operating system 110 may receive a series of read requests for the highly correlated data elements contained in the first page 202A, the second page 202B, and the third page 202C. In response to the series of read requests, the operating system 110 may read the first page 202A, the second page 202B, and the third page 202C.

When implementing a joint decoding decision, the operating system 110 may also read the threshold voltages of neighboring memory cells, some which may be contained in other neighboring pages. The second page 202B may neighbor the first page 202A. The third page 202C may neighbor the second page 202B. The fourth page 202D may neighbor the third page 202C. Here, it can be observed that some of the neighboring pages (e.g., the second page 202B and the third page 202C) overlap with the pages that are read that contain the requested memory cells. Thus, the overlapping page can be read once, and the operating system 110 may be configured to also read the fourth page 202D. By utilizing the page allocation module 116 over conventional page allocation mechanisms, the total number of pages that are read can be reduced from six pages to four pages in this example. Thus, the page allocation module 116 can result in more efficient implementation of a joint decoding decision by the operating system 110.

Figure 3:
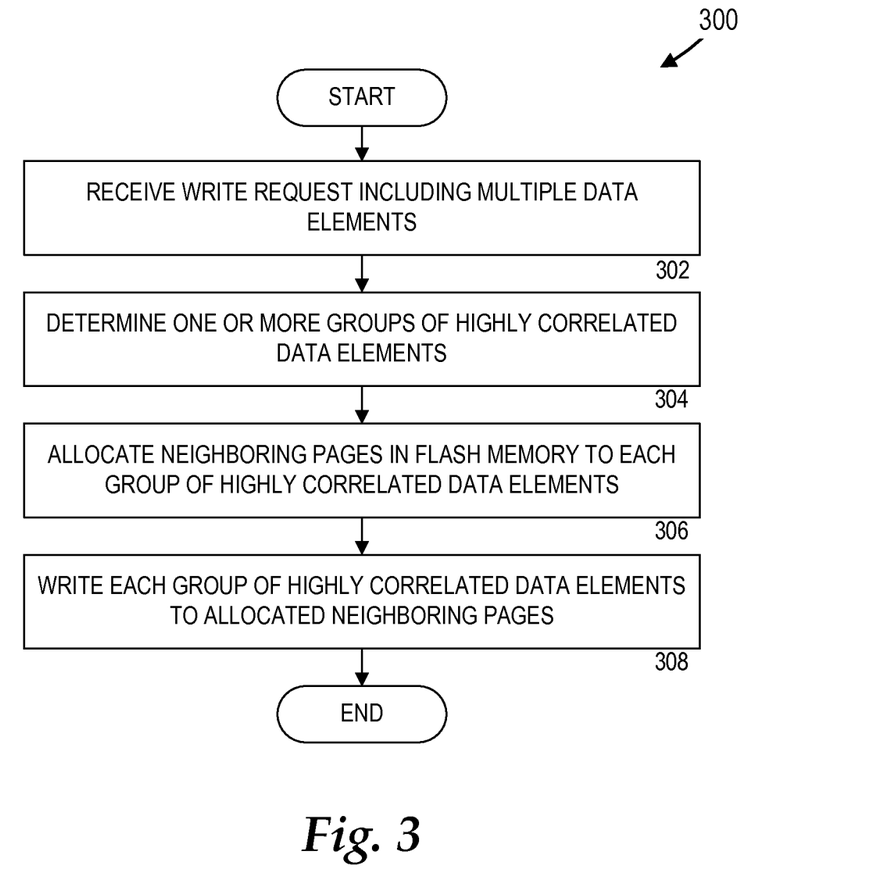
FIG. 3 is a flow diagram illustrating an example process adapted to allocate pages in a flash memory.

FIG. 3 is a flow diagram illustrating an example process 300 adapted to allocate pages in a flash memory, arranged in accordance with at least some embodiments presented herein. The process 300 may include various operations, functions, or actions as illustrated by one or more blocks 302-308.

The process 300 may begin at block 302 (Receive Write Request Including Multiple Data Elements), where the page allocation module 116 may be configured to receive a write request that includes multiple data elements, such as the data elements 114, to be written into the flash memory 102. For example, the write request may be received from the application 112. The data elements may include files, file segments, or some other distinguishable units of data. Block 302 may be followed by block 304.

At block 304 (Determine One or More Groups of Highly Correlated Data Elements), the page allocation module 116 may be configured to identify various correlations between two or more of the multiple data elements. These correlations can be utilized to form groups of highly correlated data elements. Two or more data elements may be highly correlated if the data elements are accessed concurrently, sequentially, or within a threshold amount of time.

In a first example, a web page may include a HyperText Markup Language ("HTML") file and an image file. The HTML file and the image file may be considered highly correlated because the files may be displayed together within the same web page. In a second example, a video file may be composed of multiple video frames. Each video frame may correspond to a file segment of the video file. File segments corresponding consecutive video frames may be considered highly correlated because the file segments may be processed in sequence when playing the video file. In a third example, when an e-commerce website displays information regarding a first product as requested by a customer, the e-commerce website may also display information regarding a similar or corresponding second product as a suggestion for the customer. The information regarding the first product and the information regarding the second product may be considered highly correlated because the information for both products may be concurrent displayed via the e-commerce website.

In some embodiments, data elements may be determined to be highly correlated by monitoring application interaction with the data elements. For example, the application 112 may access (e.g., read and/or write) certain data elements concurrently, sequentially, or within a threshold amount of time. A monitoring module 124 may be configured to monitor and record the time at which each data element is accessed by the application 112. The access time of each data element may be stored in the monitoring record 118. When the operating system 110 receives a write request to store multiple data elements to the flash memory 102, the page allocation module 116 may be configured to identify highly correlated groups of data elements by analyzing the access times of the data elements in the monitoring record 118.

In some other embodiments, data elements may be determined to be highly correlated based on the heuristics 120. A heuristic may refer to a predefined rule that can be applied to identify certain data elements as being highly correlated. The data elements may be correlated or distinguished based on an identifier (e.g., a file name extension, embedded metadata, external metadata, file header, etc.) associated with or contained within each of the data elements. In one example, a data structure may be embodied in data elements that span multiple pages. In such a case, the heuristics 120 may specify that data elements that are part of the data structure are highly correlated. In another example, an audio file may be embodied in multiple data elements that span multiple pages. In such a case, the heuristics 120 may specify that data elements representing consecutive audio segments in the audio file are highly correlated.

In yet some other embodiments, data elements may be determined to be highly correlated based on user interaction with an application. For example, the application 112 may enable a user to flag or highlight certain data elements as being highly correlated. The user-provided correlations may be stored in the user-interaction record 122. When the operating system 110 receives a write request to store multiple data elements to the flash memory 102, the page allocation module 116 may be configured to identify highly correlated groups of data elements by utilizing the correlations stored in the user-interaction record 122.

The page allocation module 116 may be configured to determine the highly correlated groups using the monitoring record 118, the heuristics 120, and/or the user-interaction record 122. The page allocation module 116 may also be configured to compute a correlation score for each group of data elements. A higher correlation score may represent a higher correlation, while a lower correlation score may represent a lesser correlation between two or more data elements. Data elements may be considered highly correlated if they meet a minimum correlation score. The correlation score may be determined based on a statistical model associated with the monitoring record, the heuristics 120, and/or the user-interaction record 122. The statistical model may specify that some properties or combinations of properties may be associated with a higher correlation score, while some other properties or other combinations of properties may be associated with a lower correlation score. Block 304 may be followed by block 306.

At block 306 (Allocate Neighboring Pages in Flash Memory to Each Group of Highly Correlated Data Elements), the page allocation module 116 may be configured to allocate neighboring pages in the flash memory 102, as possible, to each group of highly correlated data elements. In some embodiments, neighboring pages may be adjacent pages within the flash memory 102. For example, the adjacent pages may have consecutive memory addresses. In some other embodiments, neighboring pages may be near-adjacent pages within the flash memory 102. In some case, free adjacent pages may not be available, so near-adjacent pages that are physically closer may be allocated. Block 306 may be followed by block 308.

At block 308 (Write Each Group of Highly Correlated Data Elements to Allocated Neighboring Pages), the page allocation module 116 may be configured to write each group of highly correlated data elements to the allocated neighboring pages in the flash memory 102. After block 308, the process 300 either repeat (e.g., periodically, continuously, or on demand as needed) or terminate.

Figure 4:
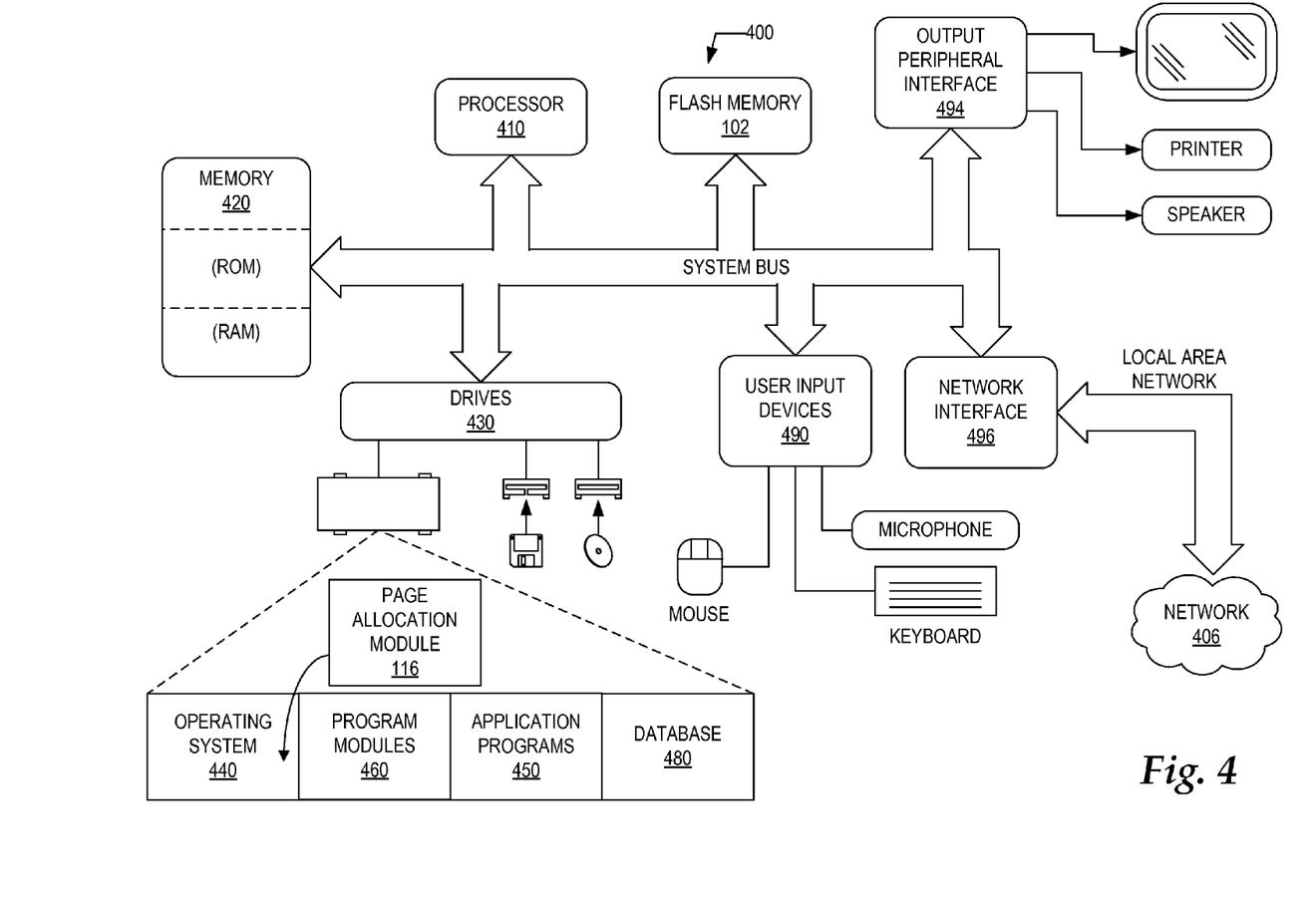
FIG. 4 is a block diagram illustrating a computer hardware architecture for an example computing system.

FIG. 4 is a block diagram illustrating a computer hardware architecture for an example computing system, arranged in accordance with at least some embodiments presented herein. FIG. 4 includes a computer 400, including a processor 410, memory 420, and one or more drives 430. The computer 400 may be implemented as a conventional computer system, an embedded control computer, a laptop, or a server computer, a mobile device, a set-top box, a kiosk, a vehicular information system, a mobile telephone, a customized machine, or other hardware platform.

The drives 430 and their associated computer storage media, provide storage of computer readable instructions, data structures, program modules and other data for the computer 400. The drives 430 can include an operating system 440, application programs 450, program modules 460, and a database 480. The operating system 440 may be configured to include the page allocation module 116 for allocating pages in the flash memory 102. The computer 400 further includes user input devices 490 through which a user may enter commands and data. Input devices can include an electronic digitizer, a microphone, a keyboard and pointing device, commonly referred to as a mouse, trackball or touch pad. Other input devices may include a joystick, game pad, satellite dish, scanner, or the like.

These and other input devices can be coupled to the processor 410 through a user input interface that is coupled to a system bus, but may be coupled by other interface and bus structures, such as a parallel port, game port or a universal serial bus ("USB"). Computers such as the computer 400 may also include other peripheral output devices such as speakers, which may be coupled through an output peripheral interface 494 or the like.

The computer 400 may operate in a networked environment using logical connections to one or more computers, such as a remote computer coupled to a network interface 496. The remote computer may be a personal computer, a server, a router, a network PC, a peer device or other common network node, and can include many or all of the elements described above relative to the computer 400. Networking environments are commonplace in offices, enterprise-wide area networks ("WAN"), local area networks ("LAN"), intranets, and the Internet.

When used in a LAN or WLAN networking environment, the computer 400 may be coupled to the LAN through the network interface 496 or an adapter. When used in a WAN networking environment, the computer 400 typically includes a modem or other means for establishing communications over the WAN, such as the Internet or the network 406. The WAN may include the Internet, the illustrated network 406, various other networks, or any combination thereof. It will be appreciated that other mechanisms of establishing a communications link, ring, mesh, bus, cloud, or network between the computers may be used.

According to some embodiments, the computer 400 may be coupled to a networking environment. The computer 400 may include one or more instances of a physical computer-readable storage medium or media associated with the drives 430 or other storage devices. The system bus may enable the processor 410 to read code and/or data to/from the computer-readable storage media. The media may represent an apparatus in the form of storage elements that are implemented using any suitable technology, including but not limited to semiconductors, magnetic materials, optical media, electrical storage, electrochemical storage, or any other such storage technology. The media may represent components associated with memory 420, whether characterized as RAM, ROM, flash, or other types of volatile or nonvolatile memory technology. The media may also represent secondary storage, whether implemented as the storage drives 430 or otherwise. Hard drive implementations may be characterized as solid state, or may include rotating media storing magnetically-encoded information.

The storage media may include one or more program modules 460. The program modules 460 may include software instructions that, when loaded into the processor 410 and executed, transform a general-purpose computing system into a special-purpose computing system. As detailed throughout this description, the program modules 460 may provide various tools or techniques by which the computer 400 may participate within the overall systems or operating environments using the components, logic flows, and/or data structures discussed herein.

The processor 410 may be constructed from any number of transistors or other circuit elements, which may individually or collectively assume any number of states. More specifically, the processor 410 may operate as a state machine or finite-state machine. Such a machine may be transformed to a second machine, or specific machine by loading executable instructions contained within the program modules 460. These computer-executable instructions may transform the processor 410 by specifying how the processor 410 transitions between states, thereby transforming the transistors or other circuit elements constituting the processor 410 from a first machine to a second machine. The states of either machine may also be transformed by receiving input from the one or more user input devices 490, the network interface 496, other peripherals, other interfaces, or one or more users or other actors. Either machine may also transform states, or various physical characteristics of various output devices such as printers, speakers, video displays, or otherwise.

Encoding the program modules 460 may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules 460 may transform the physical state of the semiconductor memory 420 when the software is encoded therein. For example, the software may transform the state of transistors, capacitors, or other discrete circuit elements constituting the semiconductor memory 420.

As another example, the storage media may be implemented using magnetic or optical technology such as drives 430. In such implementations, the program modules 460 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description.

Figure 5:
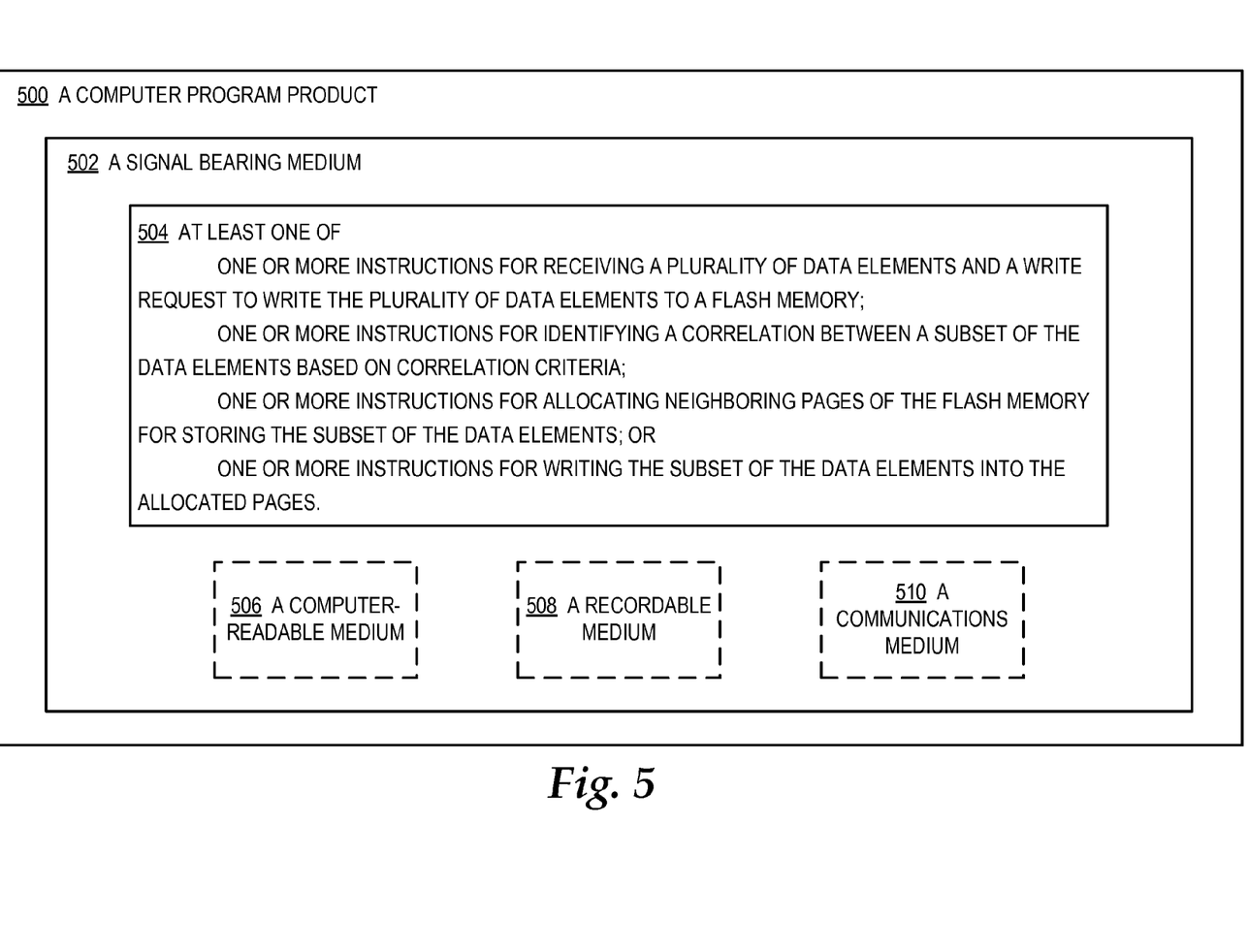
FIG. 5 is a schematic diagram illustrating a computer program product that includes a computer program for executing a computer process on a computing device; all arranged in accordance with at least some embodiments presented herein.

FIG. 5 is a schematic diagram that illustrates a computer program product 500 that includes a computer program for executing a computer process on a computing device, arranged in accordance with at least some embodiments presented herein. An illustrative embodiment of the example computer program product is provided using a signal bearing medium 502, and may include at least one instruction of 504: one or more instructions for receiving a plurality of data elements and a write request to write the plurality of data elements to a flash memory; one or more instructions for identifying a correlation between a subset of the data elements based on correlation criteria; one or more instructions for allocating neighboring pages of the flash memory for storing the subset of the data elements; or one or more instructions for writing the subset of the data elements into the allocated pages. In some embodiments, the signal bearing medium 502 of the one or more computer program products 500 include a computer readable medium 506, a recordable medium 508, and/or a communications medium 510.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multi-core processor systems, microprocessor-based or programmable consumer electronics, minicomputers, mainframe computers, and the like.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the Detailed Description, claims, or Figures, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 elements refers to groups having 1, 2, or 3 elements. Similarly, a group having 1-5 elements refers to groups having 1, 2, 3, 4, or 5 elements, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A computer-implemented method to allocate pages in a flash memory, the method comprising:
    receiving a plurality of data elements and a write request to write the plurality of data elements to the flash memory, wherein the plurality of data elements comprises a plurality of files or file segments;
    identifying, by a computing device, a correlation between a subset of the data elements based on correlation criteria by computing a correlation score for the subset of the data elements, wherein the correlation score is computed based on a statistical model associated with one or more of, a heuristic and a user-interaction record specifying the correlation criteria, wherein the subset of the data elements comprises consecutive video frames of a video file;
    allocating, by the computing device, neighboring pages of the flash memory for storing the subset of the data elements;
    writing, by the computing device, the subset of the data elements into the allocated pages;
    receiving a series of read requests to read the subset of the data elements; and
    reading, by the computing device, the subset of the data elements from the allocated pages and additional pages neighboring the allocated pages, wherein overlapping pages of the allocated pages and the additional pages within different read requests from the series of read requests are read once.

2. The method of claim 1, wherein
    reading, by the computing device, the subset of the data elements from the allocated pages and additional pages neighboring the allocated pages is according to a joint decoding decision that compensates for inter-cell interference.

3. The method of claim 1, wherein identifying the correlation between the subset of the data elements based on the correlation criteria comprises determining that the subset of the data elements are correlated when the subset of the data elements are accessed concurrently, sequentially, or within a threshold amount of time.

4. The method of claim 3, wherein determining that the subset of the data elements are correlated when the subset of the data elements are accessed concurrently, sequentially, or within the threshold amount of time comprises determining that the subset of the data elements are correlated based on the monitoring record of previous accesses of the subset of the data elements.

5. The method of claim 3, wherein determining that the subset of the data elements are correlated when the subset of the data elements are accessed concurrently, sequentially, or within the threshold amount of time comprises determining that the subset of the data elements are correlated based on the heuristic.

6. The method of claim 3, wherein determining that the subset of the data elements are correlated when the subset of the data elements are accessed concurrently, sequentially, or within the threshold amount of time comprises determining that the subset of the data elements are correlated based on the user-interaction record containing user input of the correlation.

7. The method of claim 1, wherein the neighboring pages comprises adjacent pages within a wordline.

8. The method of claim 1, wherein the neighboring pages comprises adjacent pages between multiple wordlines.

9. The method of claim 1, wherein the flash memory comprises a NAND type flash memory.

10. The method of claim 1, wherein the flash memory is a single-level type flash memory.

11. A non-transitory computer-readable medium comprising computer-executable instructions stored thereon which, when executed by a computer, cause the computer to:
    receive a plurality of data elements and a write request to write the plurality of data elements to a flash memory, wherein the plurality of data elements comprises one or more of a HyperText Markup Language (HTML) file, a video file, and an image file;
    identify a correlation between a subset of the data elements based on correlation criteria, by computing a correlation score for the subset of the data elements, wherein the correlation score is computed based on a statistical model associated with one or more of a heuristic and a user-interaction record specifying the correlation criteria, wherein the subset of the data elements comprises consecutive video frames of the video file;
    allocate neighboring pages of the flash memory for storing the subset of the data elements;
    write the subset of the data elements into the allocated pages; and
    in response to a receipt of a series of read requests to read the subset of the data elements, read the subset of the data elements from the allocated pages and additional pages neighboring the allocated pages, wherein overlapping pages of the allocated pages and the additional pages within different read requests from the series of read requests are read once.

12. The non-transitory computer-readable medium of claim 11, further comprising computer-executable instructions stored thereon which, when executed by the computer, cause the computer to:
   read the subset of the data elements from the allocated pages and the additional pages neighboring the allocated pages according to a joint decoding decision that compensates for inter-cell interference.

13. The non-transitory computer-readable medium of claim 11, wherein to identify the correlation between the subset of the data elements based on the correlation criteria, the computer-executable instructions further cause the computer to determine that the subset of the data elements are correlated when the subset of the data elements are accessed concurrently, sequentially, or within a threshold amount of time.

14. The non-transitory computer-readable medium of claim 11, wherein the subset of the data elements comprises a first data element including information of a first product and a second data element including information of a second product that is related to the first product.

15. The non-transitory computer-readable medium of claim 11, wherein the neighboring pages comprises adjacent pages within a wordline.

16. A computing device, comprising:
   a flash memory comprising a plurality of memory cells arranged to form a plurality of memory pages; and
   an operating system coupled to the flash memory and configured to:
      receive a plurality of data elements and a write request to write the plurality of data elements to the flash memory, wherein the plurality of data elements comprises a plurality of files or file segments;
      identify a correlation between a subset of the data elements based on correlation criteria by computing a correlation score for the subset of the data elements, wherein the correlation score is computed based on a statistical model associated with one or more of a heuristic and a user-interaction record specifying the correlation criteria;
      allocate neighboring pages of the flash memory for storing the subset of the data elements;
      write the subset of the data elements into the allocated pages; and
      in response to a receipt of a series of read requests to read the subset of the data elements, read the subset of the data elements from the allocated pages and additional pages neighboring the allocated pages, wherein overlapping pages of the allocated pages and the additional pages within different read requests from the series of read requests are read once.

17. The computing device of claim 16, wherein the operating system is further configured to:
   read the subset of the data elements from the allocated pages and the additional pages neighboring the allocated pages according to a joint decoding decision that compensates for inter-cell interference.

* * * * *

UNITED STATES PATENT AND TRADEMARK OFFICE
CERTIFICATE OF CORRECTION

PATENT NO. : 9,448,921 B2  
APPLICATION NO. : 13/879708  
DATED : September 20, 2016  
INVENTOR(S) : Ma Page 1 of 1

It is certified that error appears in the above-identified patent and that said Letters Patent is hereby corrected as shown below:

On the title page

On Page 2, item (56), under "OTHER PUBLICATIONS", in Column 2, Line 53, delete "effcient" and insert -- efficient --, therefor.

On Page 2, item (56), under "OTHER PUBLICATIONS", in Column 2, Line 66, delete "Applicatons," and insert -- Applications, --, therefor.

In the specification

In Column 1, Line 8, delete "§371" and insert -- § 371 --, therefor.

In Column 5, Line 9, delete "108G, 108G," and insert -- 108G, 108I, --, therefor.

Signed and Sealed this  
Twentieth Day of December, 2016

Michelle K. Lee  
*Director of the United States Patent and Trademark Office*